United States Patent
Koenekamp et al.

(10) Patent No.: US 7,686,111 B2
(45) Date of Patent: Mar. 30, 2010

(54) HV BATTERY COOLING WITH EXHAUST FLOW OF FUEL CELL SYSTEMS

(75) Inventors: Andreas Koenekamp, Darmstadt (DE); Reiner Wilpsbaeumer, Weisbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 423 days.

(21) Appl. No.: 11/676,442

(22) Filed: Feb. 19, 2007

(65) Prior Publication Data
US 2008/0196956 A1    Aug. 21, 2008

(51) Int. Cl.
*B60K 1/00*    (2006.01)
(52) U.S. Cl. .............. 180/65.1; 180/68.2; 180/68.3
(58) Field of Classification Search ........... 180/68.1, 180/68.2, 68.3, 309, 65.3, 68.5, 65.31; 903/907, 903/908; 429/26
See application file for complete search history.

(56) References Cited

U.S. PATENT DOCUMENTS

| | | | |
|---|---|---|---|
| 3,976,506 A * | 8/1976 | Landau | 429/17 |
| 5,811,201 A * | 9/1998 | Skowronski | 429/17 |
| 6,302,228 B1 * | 10/2001 | Cottereau et al. | 180/68.1 |
| 6,607,854 B1 * | 8/2003 | Rehg et al. | 429/13 |
| 6,978,855 B2 * | 12/2005 | Kubota et al. | 429/13 |

* cited by examiner

*Primary Examiner*—Paul N Dickson
*Assistant Examiner*—Bryan A Evans
(74) *Attorney, Agent, or Firm*—John A. Miller; Miller IP Group, PLC

(57) ABSTRACT

A fuel cell system for a hybrid vehicle that includes a high voltage battery, where the system uses a cathode exhaust gas airflow from a fuel cell stack to draw air through a battery compartment in which the battery is mounted to provide battery cooling. An air intake line is in fluid communication with the passenger compartment of the vehicle and the battery compartment. An ejector line is in fluid communication with the battery compartment and the cathode exhaust gas pipe. The flow of the cathode exhaust gas around the injector pipe creates a low pressure area, which draws air through the battery compartment from the passenger compartment. In one embodiment, a compressor that provides the cathode inlet air to the fuel cell stack is used at low stack output loads, such as during vehicle idle, to direct air through the cathode exhaust gas pipe, and cool the battery system under low load conditions.

15 Claims, 1 Drawing Sheet

HV BATTERY COOLING WITH EXHAUST FLOW OF FUEL CELL SYSTEMS

BACKGROUND OF THE INVENTION

1. Field of the Invention

This invention relates generally to a battery cooling system for a vehicle and, more particularly, to a battery cooling system for a fuel cell hybrid vehicle, where the battery cooling system uses the exhaust gas flow from a fuel cell stack to create a partial vacuum that draws air through the battery system from the passenger compartment of the vehicle.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The dynamic power of a fuel cell system is limited. Further, the time delay from system start-up to driveability and low acceleration of a fuel cell vehicle may not be acceptable. During a drive cycle, the stack cell voltage varies because the variable driver power request follows the stack polarization curve. The voltage cycles can decrease the stack durability. These drawbacks can be minimized by using a high voltage battery in parallel with the fuel cell stack. Algorithms are employed to provide the distribution of power from the battery and the fuel cell stack to meet the requested power.

For the reasons discussed above, some fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

In one known fuel cell vehicle hybrid design, the battery is part of a battery system enclosed within a housing or compartment, where the system includes a plurality of battery modules, each having a number of battery cells. The battery system further includes various power control modules, electronic control circuits, etc., enclosed within the compartment. In this particular design, it is typically necessary to cool the battery modules because they generate a significant amount waste heat that could reduce the performance and life of the battery system.

It is known in the fuel cell art to use the cooling sub-system that cools the fuel cell stack to also cool the battery system. For example, flow channels may be provided at appropriate locations in the battery system compartment that are plumbed to the coolant loop through which a cooling fluid flows that cools the fuel cell stack. The cooling sub-system typically will include a radiator and a fan that reduces the temperature of the cooling fluid before it is returned to the fuel cell stack to collect the stack waste heat. However, this type of liquid cooling system for the battery system has a number of drawbacks in that it is fairly complex to provide the necessary pipes and such to direct the cooling fluid to the battery compartment. Further, during high load conditions, the ability of the radiator and cooling fan to cool the cooling fluid is reduced, which may not be adequate to cool the battery system to the desired temperature, thus requiring a larger radiator and fan to cool both the fuel cell stack and the battery system under these conditions. Also, the normal operating temperature of the fuel cell stack, typically between 60° C. and 80° C., is generally too high for proper battery system cooling. Generally, it is desirable to maintain the temperature of the battery system below 40° C.

It is also known in the art employ a separate thermal sub-system for the cooling the battery system that uses air as the cooling medium. In one particular design, a fan is employed to draw air from the passenger compartment of the vehicle, which is typically at a comfortable temperature, and drive the air through the battery compartment so that it flows around the battery modules. The heated air that flows through the battery compartment is then exhausted to the environment. The air cooled thermal sub-system is typically not able to provide as great amount of cooling as a liquid cooled thermal sub-system, but it is less complex and easier to implement. However, the fan used in the air-cooled battery thermal sub-system requires power to drive the fan, and suitable packaging space. Therefore, it is desirable to eliminate the fan to reduce the weight, packaging space and power required by the fuel cell vehicle.

SUMMARY OF THE INVENTION

In accordance with the teachings of the present invention, a fuel cell system is disclosed for a hybrid vehicle that includes a high voltage battery, where the system uses a cathode exhaust gas airflow from a fuel cell stack to draw air through a battery compartment in which the battery is mounted to provide battery cooling. An air intake line is in fluid communication with the passenger compartment of the vehicle and the battery compartment. An ejector line is in fluid communication with the battery compartment and the cathode exhaust gas pipe. The flow of the cathode exhaust gas around the injector pipe creates a low pressure area, which draws air through the battery compartment from the passenger compartment. In one embodiment, a compressor that provides the cathode inlet air to the fuel cell stack is used at low stack output loads, such as during vehicle idle, to direct air through the cathode exhaust gas pipe, and cool the battery system under low load conditions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system for a hybrid vehicle that employs a technique for drawing cooling air from a passenger compartment of the vehicle through a battery sub-system using a cathode exhaust gas flow is merely exemplary in nature, and is no way intended to limit the invention or its applications or uses. For example, the present invention has particular application for a fuel cell hybrid vehicle. However, as will be appreciated by those skilled in the art, the cooling system of the invention may have other applications.

Figure 1:
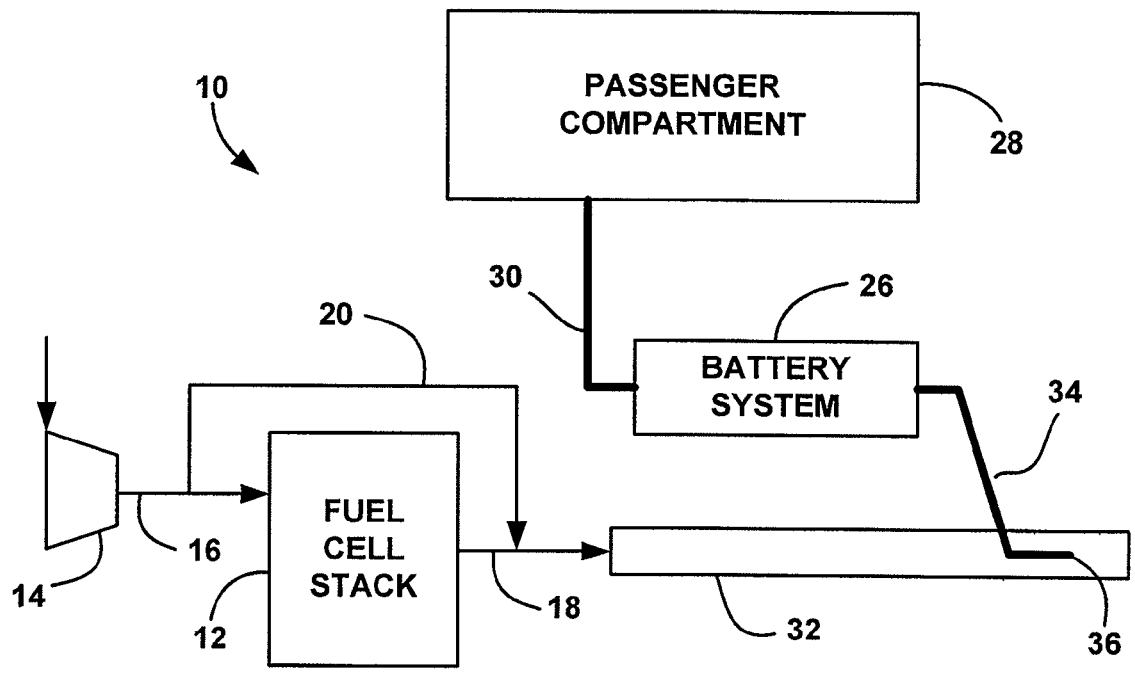
FIG. 1 is a schematic block diagram of a fuel cell system for a hybrid vehicle that employs a thermal sub-system for cooling a battery sub-system, according to an embodiment of the present invention.

FIG. 1 is a schematic block diagram of a vehicle system 10 for a fuel cell hybrid vehicle. The system 10 includes a fuel cell stack 12 that receives a cathode input airflow from a compressor 14 on a cathode input line 16. The compressor 14 drives the cathode air through the fuel cell stack 12, and a cathode exhaust gas is output from the cathode side of the fuel cell stack 12 on output line 18. According to one embodiment of the present invention, the compressor 14 is a turbo-type compressor having a relatively high revolution rate to provide the desired airflow necessary for high stack loads. A turbo-type compressor typically has a minimum rotational speed where the compressor will not operate properly below that speed. However, the minimum speed of the compressor 14 may be too high for a particular low output load of the fuel cell stack 12, such as the output load required when the vehicle is idling. Therefore, in order to prevent certain disadvantages, such as drying of the membranes within the fuel cell stack 12, a large portion of the cathode inlet air by-passes the stack 12 on by-pass line 20 under low load conditions.

The system 10 includes a battery system 26 of the type discussed above for a hybrid fuel cell vehicle. The battery system 26 is intended to generally represent battery modules, battery components and control circuits mounted within a compartment. Different battery systems will have different designs. The battery system 26 needs to operate at a relatively low temperature, such as below 40° C., to provide a suitable life and performance. In this design, air within a vehicle passenger compartment 28 is used to provide cooling air for the battery system 26, where the cooling air is drawn from the passenger compartment 28 through a suitable pipe 30.

An expanded portion of the cathode exhaust gas outlet line 18 is shown as pipe 32. An injector pipe 34 is in fluid communication with the battery system 26 and the exhaust pipe 32. The pipe 34 includes an injector end 36. Based on the venturi effect, the cathode exhaust gas that flows through the pipe 32 creates a partial vacuum at the injector end 36 that has a lower pressure than the passenger compartment 28. This lower pressure draws air from the passenger compartment 28 through the line 30, through the battery system 26, through the line 34 and out of the pipe 32.

Figure 2:
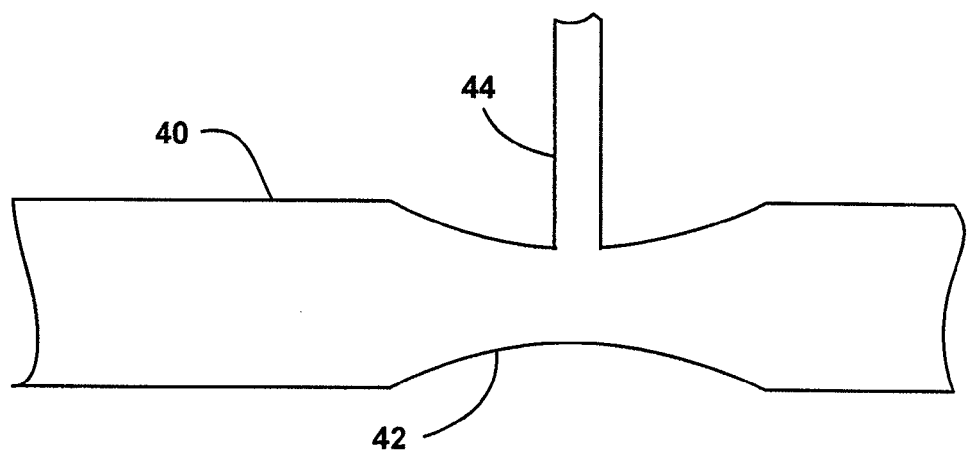
FIG. 2 is a plan view of an injector pipe coupled to a narrow region of a cathode exhaust gas pipe from the fuel cell stack to provide suction.

FIG. 2 is a representative view of how the venturi effect works to create such a vacuum. A pipe 40 represents the exhaust gas pipe 32 and a pipe 44 represents the injector pipe 34. An airflow flowing through the pipe 40 flows through a constricted or narrower diameter region 42 where the pipe 44 is coupled to the pipe 40. The pressure of the airflow through the pipe 40 causes the air to speed up as it flows through the constricted region 42. The increased speed of the airflow causes the air molecules to separate, which reduces the air pressure at that location, causing the partial vacuum, which draws air from the passenger compartment 28.

At low power loads, where the cathode inlet airflow is low, the air from the compressor 14 on the by-pass line 20 is used to provide the necessary cooling for the battery system 26. Particularly, as discussed above, the compressor 14 is a turbo-type compressor that may, in one example, have a minimum rotational speed of 30,000 RPMs. At this minimum compressor speed, approximately 15 grams per second of airflow is provided. At idle load requests, the cathode airflow requirement may only be 3 grams per second. Therefore, the other 12 grams per second of airflow are routed around the fuel cell stack 12 on the by-pass line 20 to the exhaust line 18, which creates the desired partial vacuum at the injector end 36. Thus, there is sufficient cooling air flowing from the passenger compartment 28 and through the battery system 26 at all operation conditions of the fuel cell system.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle system comprising:
   a passenger compartment;
   a battery sub-system including a battery and battery components mounted in a battery compartment;
   a fuel cell stack including a cathode input line and a cathode output line, said cathode input line receiving a cathode input airflow and said cathode output line receiving a cathode exhaust gas flow from the stack;
   a cooling line in fluid communication with the passenger compartment and the battery compartment; and
   an injector line in fluid communication with the battery compartment and the cathode output line, wherein the cathode exhaust gas flow through the cathode output line creates reduced pressure in the cathode output line proximate the injector line that draws air from the passenger compartment through the battery compartment and into the cathode output line.

2. The system according to claim 1 further comprising a compressor that provides the cathode input airflow to the fuel cell stack.

3. The system according to claim 2 further comprising a by-pass line that is coupled to the cathode input line and the cathode output line, and allows air from the compressor to by-pass the fuel cell stack.

4. The system according to claim 3 wherein a portion of the compressor air by-passes the fuel cell stack on the by-pass line when the stack output power requires less compressor airflow than a minimum compressor airflow.

5. The system according to claim 4 wherein the compressor is a turbo-type compressor.

6. The system according to claim 1 wherein the cathode output line includes a narrow portion, and wherein the injector line is coupled to the cathode output line proximate the narrow portion.

7. A fuel cell system comprising:
   a battery positioned within a battery housing;
   a fuel cell stack including a cathode input line and a cathode output line, said cathode output line receiving a cathode exhaust gas flow from the stack; and
   a pipe in fluid communication with the battery housing and the cathode output line, wherein the cathode exhaust gas flow through the cathode output line creates a partial vacuum in the cathode output line that draws air through the battery compartment and into the cathode output line.

8. The system according to claim 7 wherein the fuel cell system is on a fuel cell hybrid vehicle.

9. The system according to claim 7 further comprising a compressor that provides a cathode input airflow to the cathode input line.

10. The system according to claim 9 further comprising a by-pass line that is coupled to the cathode input line and the cathode output line, and allows air from the compressor to by-pass the fuel cell stack.

11. The system according to claim 10 wherein a portion of the compressor air by-passes the fuel cell stack on the by-pass line when the stack output power requires less compressor airflow than a minimum compressor airflow.

12. The system according to claim 11 wherein the compressor is a turbo-type compressor.

13. The system according to claim 7 wherein the cathode output line includes a narrow portion, and wherein the pipe is coupled to the cathode output line proximate the narrow portion.

14. A fuel cell hybrid vehicle comprising:
   a passenger compartment;
   a battery sub-system including a battery and battery components mounted in a battery compartment;
   a fuel cell stack including a cathode input line and a cathode output line, said cathode output line receiving a cathode exhaust gas flow from the stack;
   a compressor for providing cathode input airflow to the cathode input line;
   a by-pass line in fluid communication with the cathode input line and the cathode output line that allows air from the compressor to by-pass the fuel cell stack;
   a cooling line in fluid communication with the passenger compartment and the battery compartment; and
   an injector line in fluid communication with the battery compartment and the cathode output line, wherein the cathode exhaust flow through the cathode output line creates a reduced pressure area in the cathode output line proximate the injector line that draws air from the passenger compartment through the battery compartment and into the cathode output line, and wherein compressor air that by-passes the fuel cell stack on the by-pass line also creates a reduced pressure area in the cathode output line proximate the injector line that draws air from the passenger compartment through the battery compartment and into the cathode output line.

15. The system according to claim 14 wherein the compressor is a turbo-type compressor.

* * * * *